Oct. 6, 1953
S. ZAUGG
2,654,794
SEALED STORAGE CELL AND BATTERY AND
METHOD OF MANUFACTURING THE SAME
Filed Dec. 15, 1949
2 Sheets-Sheet 1
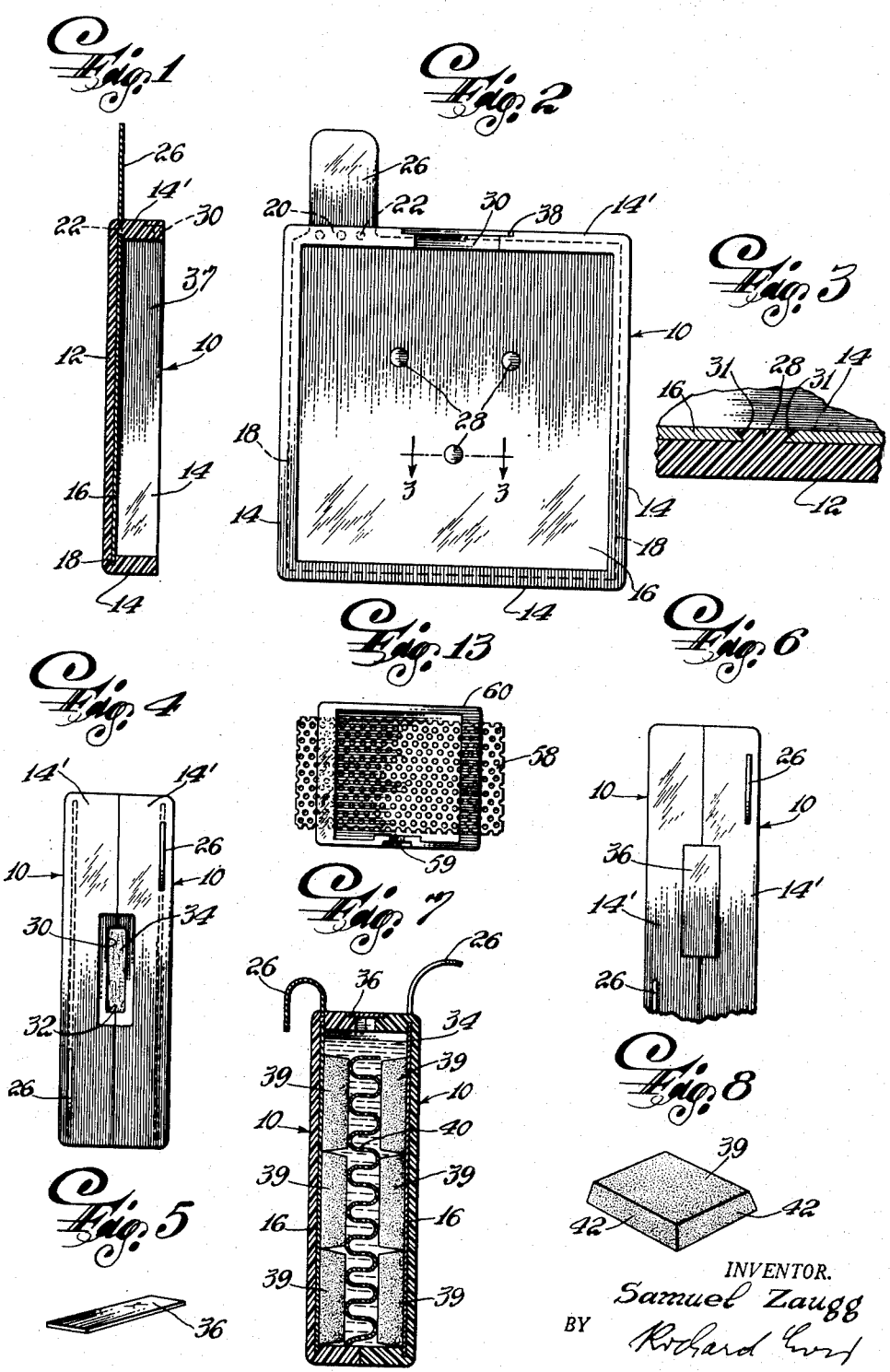
INVENTOR.
Samuel Zaugg
BY
AGENT

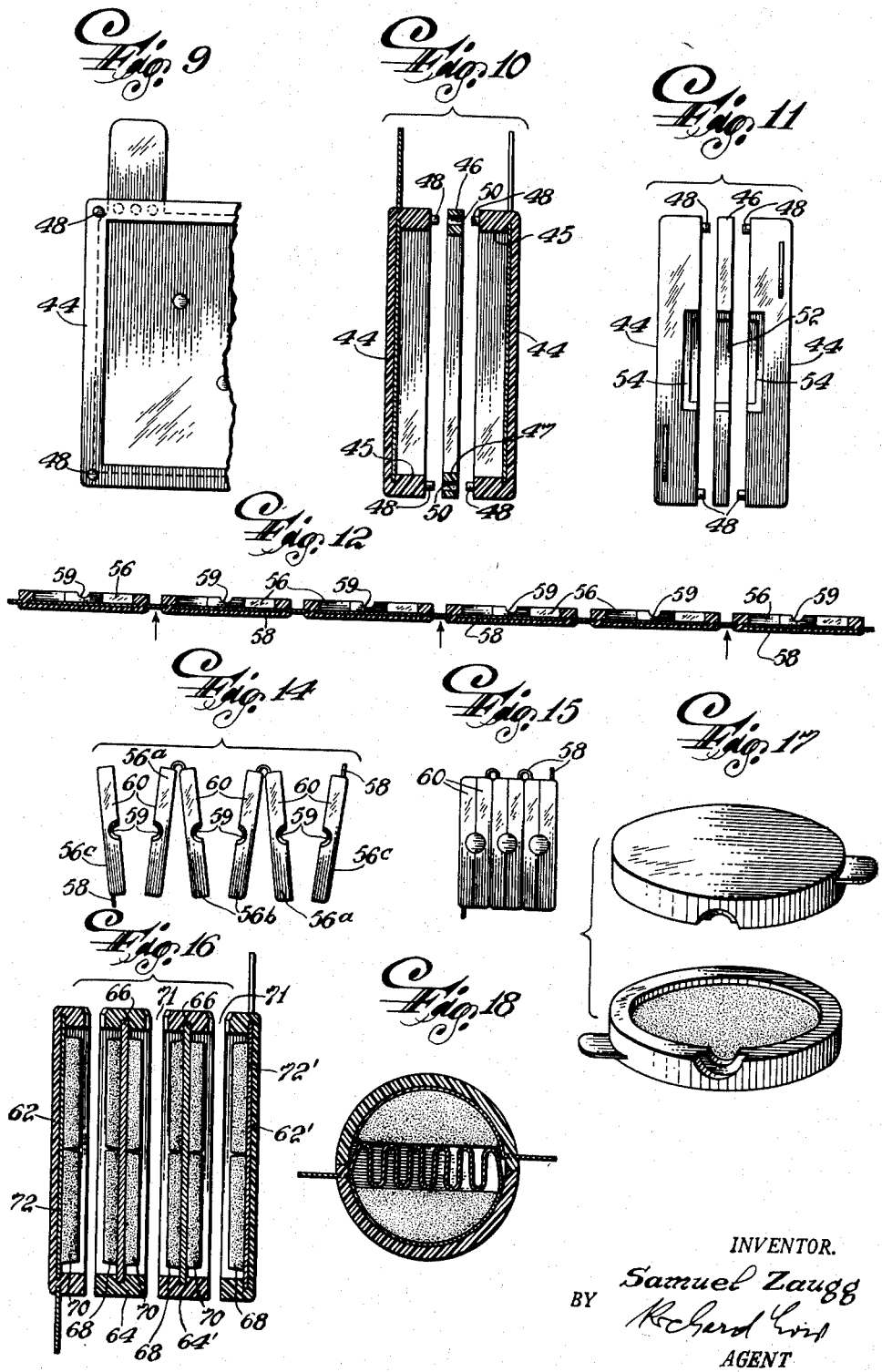

Patented Oct. 6, 1953

2,654,794

UNITED STATES PATENT OFFICE 2,654,794

SEALED STORAGE CELL AND BATTERY AND METHOD OF MANUFACTURING THE SAME

Samuel Zaugg, Solothurn, Switzerland, assignor to La Societe des Accumulateurs Elbric, S. A., Lausanne, Switzerland, a corporation of Switzerland Application December 15, 1949, Serial No. 133,129

17 Claims. (Cl. 136—7)

This invention relates to a storage cell construction and more particularly to a cell of the type referred to which is especially designed for portable uses.

My invention primarily aims at a secondary cell designed to replace the so-called dry cell which has the advantages of cheapness, portability, and convenience and has great commercial importance in the operation of flashlights, hearing aids, etc. However, the dry cell which is a primary cell has a number of drawbacks. Their initial voltage is small, usually 1.4 to 1.5 volts; the internal resistance is high; and the voltage drops rapidly during service. Yet, up to now it was not possible to substitute secondary batteries for dry cells although secondary batteris, when compared with primary batteries, have a higher initial electric pressure, namely, 2 to 2.1 volts; and a lower internal resistance. Also, their voltage drops slowly even if discharged at a high rate. They constitute, as from their discharge curves can be seen, a source of practically constant potential until the voltage falls rapidly during the last portion of the whole discharge period.

More specifically, important objects of my invention center about the provision of a storage cell which is safe for portable purposes, light in weight, small in bulk, simple in construction, and inexpensive to manufacture.

One important object of my invention is to provide a hermetically sealed storage cell and, thus, to eliminate the risks associated with the spilling of electrolyte.

The plates usually used in storage cells, mainly due to the framework employed, are more or less heavy and bulky and take up a relatively large portion of the space available. One primary object of my invention is a simplified storage cell construction which provides for the largest possible part of the plates to become active material. My invention makes it thus possible to provide a storage cell of relatively large watt capacity.

A further object of my invention is to provide a storage cell having a low internal resistance.

One object of my invention is to provide a storage cell using the material for the electrodes or plates in preshaped form. Another object is to use such preshaped electrodes which have partly undergone the chemical change to active material.

Further objects of my invention are to provide a plastic cell container and a novel assembly of the container and conductors.

A still further object of my invention is a storage cell using a separator which urges the plates against their conductors.

To the accomplishment of the foregoing and other objects which will hereinafter appear, my invention consists in the storage cell and storage cell elements and the relation of these elements one to the other, as hereinafter are more particularly described in the specification and sought to be defined in the claims. The specification is accompanied by drawings in which:

Fig. 1 is a section taken in elevation through a portion or section of a storage cell container embodying features of my invention;

Fig. 2 is another elevational view thereof;

Fig. 3 is an enlarged fragmentary section taken in the plane of the line 3—3 of Fig. 2;

Fig. 4 is a plan view of a storage cell using a container made up of two sections as shown in Figs. 1 and 2, showing the cell in open condition;

Fig. 5 is a perspective view of the closure of the cell of Fig. 4;

Fig. 6 is a fragmentary view similar to Fig. 4, but showing the cell in closed condition;

Fig. 7 is a section taken in elevation through the closed cell of Fig. 6, embodying other features of my invention;

Fig. 8 is an enlarged perspective view of a tablet of active material;

Fig. 9 is a fragmentary elevation of a modified portion or section of a storage cell container;

Fig. 10 is an elevational section of a storage cell container including two portions or sections as shown in Fig. 9, with all of the portions or sections in separated condition;

Fig. 11 is a plan view of the container sections of Fig. 10;

Fig. 12 is a sectioned view of a series of portions or sections of a storage cell container of another modified construction;

Fig. 13 is an elevational view of a single portion or section of the series of Fig. 12;

Fig. 14 is an elevation of the series of portions or sections of Fig. 12, but showing the individual portions or sections in a different relation one to the other;

Fig. 15 is an elevational view of a storage battery using cell containers as illustrated in Figs. 12 to 14;

Fig. 16 indicates a storage battery consisting of cells of still another modified construction;

Fig. 17 illustrates a further modification of a storage cell, with the halves of the cell in separated condition; and Fig. 18 is a sectioned view of a further modification of a storage cell.

Referring now to the drawings in greater detail but having first reference to Figs. 1 to 8, a portion or section generally designated 10 of a storage cell container is made from plastic material resistant to the electrolyte used, for instance, polystyrene, methyl methacrylate polymer, and comprises a bottom 12 and side walls 14, 14'. A conductor 16 is contiguous with the bottom 12, the edges 18 and the area 20 of the conductor being embedded in the plastic material of the container section, thus anchoring the conductor on the container section. The portion of the area 20 is provided with perforations 22 filled with plastic material, and preferably also roughened to insure a good bond between the materials to be united to prevent leakage of the electrolyte when the container section has been incorporated in a storage cell. A tongue 26 is an integral part of the conductor 16 and is provided to serve as a terminal.

The conductor 16 is provided with three holes 28, the side walls 30 of the holes being shaped so as to allow the plastic material to fill the holes in the form of tenons (see Fig. 3). This additional joint between the conductor 16 and the bottom 12 of the container section is primarily intended to prevent the conductor from buckling. Any other number of holes would serve the same purpose.

As can be seen, the container section 10 is provided with an indentation 30. Where two sections 10 should be used in the assembly of the single couple cell of Fig. 4, the two indentations 30 form an opening 32 which is used to fill the electrolyte into the cell container to complete the assembly of the cell. In Fig. 4, 34 designates the electrolyte. Upon pouring the electrolyte through the opening 32 and, thus, completing the assembly, a plate 36 shown in Fig. 5 and preferably made of the same plastic material as the container sections is placed on the seat 38 formed in the side wall 14' to be fused together with the container sections. The hermetically sealed storage cell according to my invention is shown in Fig. 6.

It will be understood that the two container sections 10 are united by any suitable means, for instance, application of a solvent of the plastic material used, a suitable adhesive, heat, as supplied by a high frequency electric current or an interposed heating element, to soften the plastic material of the surfaces in contact, etc.

Referring especially to Fig. 7, it should be noted that the cell container consists of two identical sections, each of these sections 10 being provided with a hollow space or recess 37, as can best be seen in Fig. 1. Both the positive and negative electrode, whatever active material or material to become active may be used, are formed into small plates or tablets 39 which are placed in the spaces 37. An elastic member 40 of plastic material is placed between the electrodes urging the tablets against the respective conductor, thus bringing each of the electrodes and its conductor into tight contact.

While the plates or tablets of active material may have any form, I prefer to use small blocks approximately in form of a truncated pyramid. In Fig. 8, the sides of the pyramid shown are designated 42.

If the cell of Fig. 7 is a lead cell, for instance, I mold the so-called active material consisting of powdered lead and a solution of pure sulphuric acid in water into the tablets shown. My tablets are more readily ejected from the mold, due to their pyramidlike form. Upon molding, the tablets are dried, placed in the cell container sections, immersed, separated from each other, in sulphuric acid of the proper specific gravity in the container, and subjected to the action of a direct current. As usual, lead peroxide is formed on the surface of the positive plate, and soft spongy lead on the surface of the negative plate. When these chemical changes stop, the cell is charged, having a potential difference between its terminals of about 2.05 volts. The capacity of the cell may be increased by discharging same and repeatedly charging and discharging. It will be clear that during charging of the cell, hydrogen is given off, and that the cell has to be kept open. The charged cell is ordinarily allowed to stay open for some time before it is sealed.

In accordance with my invention, I may use tablets the surface of which has been pretreated or partly changed to lead peroxide, thus making it possible to shorten by about 20 to 40% the period of time normally needed to convert all the lead in contact with the electrolyte to peroxide and soft spongy lead, respectively. If such pretreated tablets are used, the reduced charging time will do to complete the conversion into lead peroxide on the positive tablets and to take care of the entire conversion into soft spongy lead on the negative tablets, the time needed to change lead to soft spongy lead being shorter than the time needed to change lead to lead peroxide.

Due to the pyramidlike shape of my tablets, the surface accessible to the electrolyte of sulphuric acid is greatly increased, thus reducing the resistance between active material and electrolyte and improving the cell.

Once sealed and discharged, my cell which is intended to replace dry cells is not charged again. Current is drawn from my cell as long as active material remains in the cell. The active material is not restored again, and the discharged cell is discarded.

Whereas the cell container in Figs. 4, 6 and 7, apart from the closure plate 36, consists of two identical sections, the container of Figs. 9 to 11 consists of two identical sections 44 and an intermediate frame 46. The sections 44 are similar to the sections 10 already discussed except for four small guide pins 48 which are received in holes 50 provided in the frame 46, when the individual container parts are assembled. From inspection of Fig. 11, it will be seen that the frame has a cutout 52 which cooperates with the indentations 54 in the sections 44 to form an opening upon uniting the three container sections. Again, a plate similar to that shown in Fig. 5 is used to close this opening. Guide pins like those designated 48 and the pin-receiving holes may just as well be arranged in the reverse order, that is, the pins on the frame and the holes in the container sections.

If the two sections 44 are filled with a paste of active material or material adapted to become active, and the paste is pressed into the hollow spaces, particles of the material are apt to remain on the inner walls 45, thus making a junction possible between the negative and positive plates. I provide, therefore, the frame 46. Additionally, the frame is designed to have a greater width, when viewed frontally, than the walls of the container sections. From Fig. 10, it will be seen that the width of the frame extends at 47 inside of the inner walls 45.

It will be understood that I may use any number of sections of like and unlike shape to join them to form a cell container.

The cell container section 56 shown in Figs. 12 to 15 has a conductor 58 arranged and embedded therein in a fashion similar to that explained above. However, the conductor is perforated throughout its length and width as can clearly be seen in Fig. 13. The perforations ensure a particularly strong anchorage, but may just as well be provided as shown in Figs. 2 and 9. According to a feature of my invention, the conductor 58 is not only contiguous with, and anchored to, the bottom of the section, but is also designed to form a continuous strip in a series of identical sections connected by the strip (see Fig. 12). The strip bridges the gap between each two adjacent sections. To form a cell or to unite a plurality of cells, the conductor is severed between two adjacent cell sections, for instance, in the places indicated by arrows in Fig. 12. The cell sections are then brought into a relation with respect to each other as shown in Fig. 14. The connecting conductor between sections 56a and 56b is bent so that the sections will lie back to back. Upon putting active material into the container sections in any suitable way, the sections are united so that the end sections 56c and the sections 56a on the one hand and the two sections 56b on the other hand form single couple cells. It will be noted that there are cutouts 59 in one of the side walls 60 which upon joining the sections form openings. In Fig. 15, which illustrates a unit of three cell couples placed in series, the openings are shown in closed condition. Instead of the conductor 58 which is perforated all over its area, a conductor which is perforated in certain places only may also be used, for instance, in places where this is desirable to obtain a dependable bond or to prevent buckling of the conductor.

To form the unit indicated in Fig. 16, again three cell couples are to be united. In accordance with my invention, I provide two outer members 62, 62' and two inner members 64, 64', all of them made of plastic material. Embedded in the inner members are centrally arranged conductors 66 carrying substances 68 and 70 in tablet form either to be changed to different active materials or half of the tablets being pretreated. The outer members 62, 62' have conductors 72, 72' embedded therein which support active materials 70 and 68, respectively. It will be clear that the three cell unit of Fig. 16 is formed, respectively, by 62 and the left side of 64; the right side of 64 and the left side of 64'; and the right side of 64' and 62'. After uniting all of the members, the electrolyte is filled through openings to be formed at 71.

In Figs. 17 and 18, storage cells are shown of a circular cross section. In the embodiment of Fig. 17, the positive and negative electrodes are above each other, whereas in the embodiment of Fig. 18 the electrodes are in a lateral position with respect to one another.

From the foregoing detailed description, it will be clear that my new cell is not a storage cell in the usual sense of the term as far as its use is concerned. While in an ordinary so-called storage cell the active material which has been used up is restored by passing a current through the cell in the reverse direction, my cell is intended to be thrown away as being no longer of service, once the active material became worn out and the cell stopped delivering current.

When my cell has received current, it is hermetically sealed to be ready to deliver current. Principally, it is possible to again charge my cell after it has discharged, but restoration of the active material can be carried only to about 70 to 80% of the original capacity since the cell is sealed. A restoration beyond this percentage would result in the formation of gas which in the present circumstances has to be avoided.

I have found that my cell may be safely hermetically sealed if such materials are excluded from employment in the construction of the cell which tend to produce vapors or gases when in contact with the basic building materials of the cell.

While my invention contemplates using active materials in form of preshaped blocks or tablets, I may also use and apply active material in the customary way, that is, by preparing a paste and pressing same in the hollow spaces of my cell container sections. The exposed surfaces of my conductors may be roughened by a chemical or electrochemical process or by a mechanical treatment to improve the firmness of the attachment between conductor and active material.

In the case of blocks or tablets, I employ elastic members where in prior constructions separators are used to keep the plates of a cell from touching each other. In my construction, these elastic members press the preshaped active material against the electrodes.

The use of active material in preshaped forms entails great advantages when used according to my invention. Where active material is pressed into the hollow space of my cell container section and baked afterwards, shocks or pressure simply exerted by a finger against the container from the outside will more readily result in breakages than in the case of loose blocks or tablets, this being due to the fact that my cell is designed for light duty purposes and the container is, therefore, made of light gauge material. Among loose preshaped forms, small tablets have proved to withstand any kind of impact better than a single cake. Also, small blocks or tablets, as already explained, increase the surface of contact between active material and electrolyte and, hence, decrease the internal resistance of a cell. This decrease is important since my invention aims at a potential producing cell which, while small in size, is intended to deliver relatively large currents as, for instance, in cigarette lighters.

The assembly of conductor and container section according to my invention produces a most favorable condition. The space available in my container for practical use is comparatively larger than in any known construction in so far as I use conductors in sheet form, each being contiguous with a container wall. Also, my cell is hermetically sealed and does away with such devices as are used in prior portable storage cell constructions to prevent electrolyte to leak and at the same time to allow volatile products to escape. Thus, the electrical energy delivered from my cell is relatively very high. A cell of my construction measuring 35 x 48 x 15 mm. and weighing 68 grams, with an initial voltage of 2 volts and a drop to 1.7 volt at the end of the discharge, will deliver 2.5 w.-hr. during a 10-hour service.

My sealed cell does not require the addition of water since no evaporation takes place. At the same time, access of oxygen from the air is prevented which makes it possible for my cell to be much longer shelved without deterioration. My cell is well suited to be used in tropical climate where known cells do not serve satisfactorily.

Advantages which result from the use of plastic material for my container are that the container and its conductors may be easily united. The assembly, due to the use of a plastic container, is inexpensive.

The potential producing cell according to my invention embodies all of the commercially desired advantages of a dry cell, as low cost in manufacture, light weight, smallness in bulk, and suitability for portable purposes, but at the same time improves the dry cell considerably by having a higher initial voltage and a relatively large capacity and delivering a practically constant potential during use.

It will be apparent that while I have shown and described my invention in preferred forms, many changes and modifications may be made without departing from the spirit of the invention defined in the following claims.

I claim:

1. In a series of wet storage cell containers of consecutively interconnected, open, receptacle-like sections of plastic material and a conductor of sheet metal in the form of a continuous strip sheet metal arranged so as to have intermittent portions anchored on the bottoms of the inside of said sections and gap-bridging portions between sections, said intermittent portions having their outer face exposed and their inner faces in contact with the bottoms of the insides of the sections and the portions of said strip between said gap-bridging portions and said intermittent portions imbedded in the plastic material of said sections.

2. In the series according to claim 1, the sections being of identical shape, and the intermittent portions having their edges embedded in the sections, the parts of the conductor between the intermittent and gap-bridging portions being embedded in the plastic material of said containers and perforated, the perforations being filled with plastic material.

3. Wet storage cell including a container, two conductors of sheet metal terminating in terminals, two electrodes, and an electrolyte, the container consisting of two joined identical sections of plastic material, each conductor being partly embedded in one of said sections and being arranged so as to have one face in contact with an electrode and the other face with at least a portion of the inner wall of the respective section, said terminals projecting through a wall of a section and sealed therein and extending to the outside of the cell forming external terminals, the parts sealed in being perforated, the perforations being filled with plastic material.

4. Wet storage cell including a container, two conductors of sheet metal terminating in terminals, two electrodes, and an electrolyte, the container consisting of at least two joined sections of plastic material and being provided with a hermetically sealed opening, each of the conductors being anchored on a section and being arranged so as to have one face in contact with an electrode and the other face in contact with at least a portion of the inner wall of a section, said terminals projecting through a wall of a section and sealed therein and extending to the outside of the cell forming external terminals, the parts which are sealed in being perforated, the perforations being filled with plastic material.

5. Multiple wet cell unit including joined cell container sections of plastic material, conductors of sheet metal, two kinds of electrodes, and an electrolyte, the cells being contiguous with each other, each conductor being anchored on a section and being arranged so as to have one face in contact with an electrode and the other face in contact with at least a portion of the inner wall of a section, the conductors of the first and last cell section projecting outside of same and forming terminals, the electrodes of groups of two adjacent cell sections of the other sections forming connections between two adjacent sections.

6. In the method of manufacturing wet storage cells the steps which comprise supplying a flat strip of foraminous sheet metal and forming thereon spaced receptacle-like sections of plastic material each consisting of bottom and side walls with the inner wall of the bottom in contact with said strip and with the adjacent portions of said strip molded and sealed between said bottom and side walls to form a liquid-tight seal between said strip and said bottom and side walls with the portions of said strip between said receptacle-like sections protruding therefrom to form battery terminals.

7. In the method of manufacturing wet storage cells the steps which comprise supplying a flat strip of sheet metal and forming thereon spaced receptacle-like sections of plastic material each consisting of bottom and side walls with the inner wall of the bottom in contact with said strip and with the adjacent portions of said strip molded and sealed between said bottom and side walls to form a liquid-tight seal between said strip and said bottom and side walls with the portions of said strip between said receptacle-like sections protruding therefrom to form battery terminals.

8. In the method of manufacturing wet storage cells the steps which comprise supplying a flat strip of sheet metal and forming thereon spaced receptacle-like sections of plastic material each consisting of bottom and side walls with the inner wall of the bottom in contact with said strip and with the adjacent portions of said strip molded and sealed between said bottom and side walls, severing said strip at points spaced from said sections to leave terminal extensions and forming a storage cell container by joining a pair of sections along the free edges of their side walls.

9. In a wet storage cell a pair of receptacle-like sections, each having a bottom and side walls, a pair of flat sheet metal conductors, one disposed in contact with the inside of the bottom wall of each section and extending between the bottom and side walls and protruding outwardly beyond said bottom and side walls to form an extending terminal sealed with a liquid-tight seal between said bottom wall and said side walls where it protrudes therefrom.

10. In a wet storage cell a pair of receptacle-like sections, each having a bottom and side walls and joined at the free edges of the side walls, and a pair of flat sheet metal conductors, one disposed in contact with the inside of the bottom wall of each section and extending between the bottom and side walls and protruding outwardly beyond said bottom and side walls to form an extending terminal sealed with a liquid-tight seal between said bottom wall and said side walls where it protrudes therefrom.

11. In the method of manufacturing wet storage cells the steps which comprise supplying a strip of foraminous sheet metal and forming thereon spaced receptacle-like sections of plastic material consisting of bottom and side walls with the inner wall of the bottom in contact with said strip and with the adjacent portions of said strip molded and sealed between said bottom and said side walls, supplying preshaped, dried active material or material to become active into said receptacle-like sections, cutting off said strip of foraminous sheet metal between adjacent receptacle-like sections, putting an elastic member between said receptacle-like sections adapted to rest on the said active material and pressing the same in the completed cell against the said conductor and sealing two of the receptacle-like sections together to form the said storage cell.

12. In the method of manufacturing a multiple wet cell unit including joined cell container sections of plastic material, the steps which comprise forming spaced open receptacle-like container sections on a conductor of sheet metal in form of a continuous strip, severing the said conductor between two adjacent container sections so as to form units of two container sections connected together by a bridge of said sheet metal, bending the connecting bridge between two adjacent sections so that these sections will lie back to back and joining each container section of said unit with one container section of another unit to a cell container of the multiple cell unit.

13. In the method of manufacturing a multiple wet cell unit including joined cell container sections of plastic material the steps which comprise forming spaced open receptacle-like container sections of plastic material consisting of bottom and side walls with the inner wall of the bottom in contact with a conductor in form of a continuous strip and with the adjacent portions of said conductor molded and sealed between said bottom and side walls, severing the conductor between adjacent container sections to form units consisting of two container sections connected together by the said sheet metal, bending the connecting conductor between two adjacent sections so that these sections will lie bottom to bottom, putting into the said sections preshaped electrodes of material selected from the group consisting of active material or material to become active, joining each container section of each of said unit with one container section of another of said units having two container sections to form a cell of the multiple cell unit, and supplying an elastic member between each two container sections which are joined together for pressing said active materials against said conductors.

14. A wet storage cell container section comprising an open receptacle-like section of plastic material and a sheet metal member forming an integral conductor and terminal disposed in and with its inner face in contact with the bottom of said receptacle and partially imbedded in the plastic material and with its outer face exposed with the portion forming the terminal lying outside of said receptacle-like section and having a portion intermediate said terminal and the portion of said sheet metal member disposed in said receptacle imbedded in the plastic material of said section.

15. The section according to claim 14 having an indentation at an open edge, said indentation being shaped so as to complete an aperture when the section is joined with another section to form a cell container.

16. A wet storage cell container section comprising a receptacle-like container of plastic material having a bottom and side walls and a sheet metal member comprising an integral conductor and terminal portion lying against the bottom of said section with the terminal portion thereof extending beyond said receptacle with the portion of said sheet metal member between said external terminal portion of said sheet metal member and the remainder thereof sealed between the bottom and side wall of said container, said portion sealed between said bottom and side wall being perforated and having the perforations filled with the plastic material of said container.

17. A section of wet cell container comprising an open receptacle of plastic material including a bottom and side walls, a sheet metal strip disposed with one face in contact with the inside of the bottom of said container and with the other face exposed, the opposite ends of said strip extending outside of said container, and the portions of said strip adjacent said ends lying between the bottom and side walls of said container and sealed in said plastic, said portion sealed in said plastic having perforations filled with said plastic.

SAMUEL ZAUGG.

References Cited in the file of this patent

UNITED STATES PATENTS

| Number | Name | Date |
|---|---|---|
| 271,732 | Nezeraux | Feb. 6, 1883 |
| 303,891 | Shaw | Aug. 19, 1884 |
| 848,996 | Kaufman | Apr. 2, 1907 |
| 1,008,525 | Coleman | Nov. 14, 1911 |
| 1,021,900 | Smith | Apr. 2, 1912 |
| 1,285,660 | Ford | Nov. 26, 1918 |
| 1,295,122 | Chamberlain | Feb. 25, 1919 |
| 1,500,222 | Benner | July 8, 1924 |
| 1,980,902 | Blake | Nov. 13, 1934 |
| 2,486,964 | Miller | Nov. 1, 1949 |

FOREIGN PATENTS

| Number | Country | Date |
|---|---|---|
| 12,045 | Great Britain | June 21, 1894 |